United States Patent [19]

Tanaka

[11] 4,112,815
[45] Sep. 12, 1978

[54] PLASTIC FIXING DEVICE
[75] Inventor: Toshie Tanaka, Machida, Japan
[73] Assignee: Nifco Inc., Tokyo, Japan
[21] Appl. No.: 787,664
[22] Filed: Apr. 14, 1977
[30] Foreign Application Priority Data
  Apr. 15, 1976 [JP] Japan .............................. 51/46034[U]
[51] Int. Cl.² ............................................. F16B 19/00
[52] U.S. Cl. ........................................ 85/80; 85/5 R;
  24/73 P; 248/73
[58] Field of Search ................... 85/80, 5 R, 84, 3 R;
  24/213 R, 73 P, 73 PF, 73 PM, 73 MF; 248/73

[56] References Cited
U.S. PATENT DOCUMENTS

| 2,692,414 | 10/1954 | Poupitch | 24/73 MF |
|---|---|---|---|
| 3,213,745 | 10/1965 | Dwyer | 85/80 |
| 3,246,375 | 4/1966 | Landwer | 24/73 PM |
| 3,298,071 | 1/1967 | Flora | 24/73 PM |
| 3,423,055 | 1/1969 | Fisher | 85/80 |
| 3,693,494 | 9/1972 | Meyer | 85/80 |
| 3,905,570 | 9/1975 | Nieuwveld | 85/5 R |

Primary Examiner—Marion Parsons, Jr.
Attorney, Agent, or Firm—Jack R. Halvorsen; Robert W. Beart

[57] ABSTRACT

Disclosed herein is a plastic fixing device which integrally comprises a shank divided into two opposed shank sections connected to each other at their respective lower ends through a hinge portion, a pair of resilient wings extending away and aslant downwardly from the upper ends of the shank sections and a pair of engaging leg members extending away and aslant downwardly from the lower ends of said shank sections, whereby desired fastening to a given panel is accomplished by boring a hole through the panel, inserting the engaging members of the device in their fully converged state through the bored hole and, upon complete passage of the hinge portion through the entire depth of the bored hole, opening the engaging leg members into their diverged state for thereby causing the divided shank sections to be received in their fully converged state into the bored hole and, at the same time, enabling the diverged engaging leg members to remain stationary against the panel and keep the entire fixing device from slipping out of the bored hole.

4 Claims, 7 Drawing Figures

PLASTIC FIXING DEVICE

BACKGROUND OF THE INVENTION

This invention relates to a fixing device formed of a plastic material and designed to fulfil a variety of useful purposes such as of joining a plurality of panels in the face-to-face contact, fastening a bundle of electric wires to a panel and hanging articles from a panel, for example.

Generally, fixing devices of a plastic material for joining panels in face-to-face contact or for hanging articles from a panel are so constructed that leg members thereof are forced through holes bored in panels and the leg members thus passed through the panels have their leading ends split open or enlarged in diameter on the opposite side of the panels to prevent the leg members from slipping out of the bored holes or the leg members are themselves provided with engaging claws which are brought into hooking engagement with the edges of bored holes and are consequently immobilized onto the panels, with the result that the leg members thus immobilized onto the panels serve the purpose of joining the plurality of panels in the face-to-face contact or permitting articles to be hung from panels. In the case of these conventional fixing devices, their leg members usually have an extremely close relationship with the thickness of panels or the diameter of bored holes. Thus, from the standpoint of fabrication, it is essential that the fixing devices should be produced with sufficiently high dimensional accuracy. Generally, therefore, these conventional fixing devices have a common disadvantage of being so limited in their range of applications as to be of no practical utility.

An object of the present invention, therefore, is to provide a fixing device of a plastic material which is not seriously restricted by the thickness of panel or the diameter of the bored hole but is given some flexibility in that respect and consequently added practical utility and which is usable not merely for uniting a plurality of panels in the face-to-face contact but equally for fastening articles to a panel or hanging articles from a panel.

Another object of the present invention is to provide a fixing device which can easily be integrally molded by the injection molding of a plastic material.

SUMMARY OF THE INVENTION

To accomplish the objects described above according to the present invention, there is provided a fixing device which integrally comprises a shank divided by a centrally inserted slit into a pair of opposed shank sections connected to each other at the respective lower ends through a hinge portion so that the shank sections are freely diverged or converged at the hinge portion, a pair of resilient wing members extending away and aslant downwardly from the upper ends of the opposed shank sections and a pair of engaging leg members extending away and aslant downwardly from the lower ends of said shank sections.

Through a hole bored in a given panel, the pair of engaging leg members are inserted in their converged state. As the hinge portion of the fixing device passes through the entire depth of the bored hole, the engaging leg members are diverged from their converged state and at the same time the shank sections are converged from their diverged state and received into the bored hole. Possible slippage of the converged shank sections out of the bored hole is checked by the engaging leg members which are kept in their diverged state on the opposite side of the panel.

Further the fastness with which the fixing device is fastened to the panel is enhanced by the fact that the pair of resilient wing members is held in pressed contact with the panel surface. Since the fixing device fastens itself to the panel by pressing the opposite sides of the panel toward each other, it can hold two or more panels in the face-to-face contact. Besides, the fixing device, when provided with hooking means, can be used for hanging an object. Further, the fixing device of the present invention has a simple construction and, therefore, can be easily formed integrally by the conventional injection molding technique using a plastic material.

The other objects and characteristic features of the present invention will become apparent from the description to be given in further detail with reference to the accompanying drawings.

BRIEF DESCRIPTION OF THE INVENTION

Figure 1:
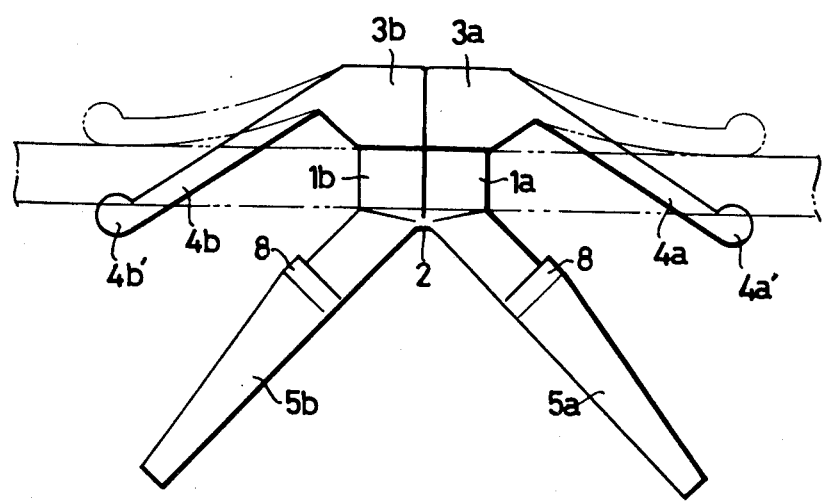
FIG. 1 is a front elevation of one preferred embodiment of the fixing device according to the present invention.
Figure 3A:
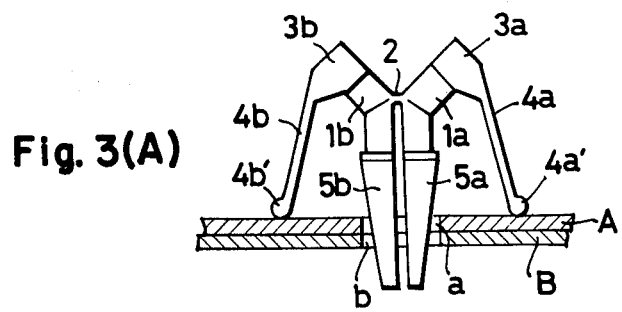
Figure 3B:
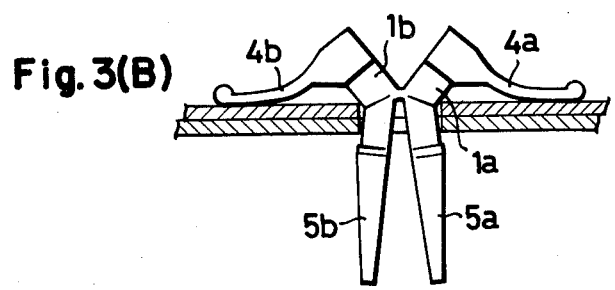
Figure 3C:
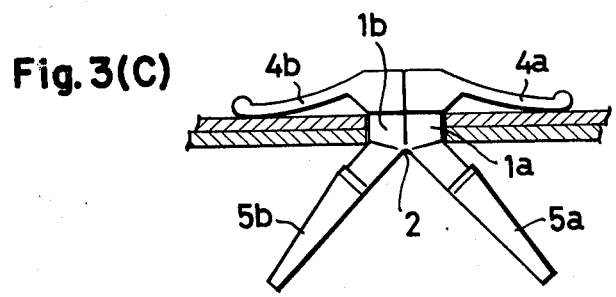

FIGS. 3(A) – (C) are explanatory diagrams showing in front elevation the sequence in which the fixing device of FIG. 1 is fastened to the plurality of panels.

Figure 4:
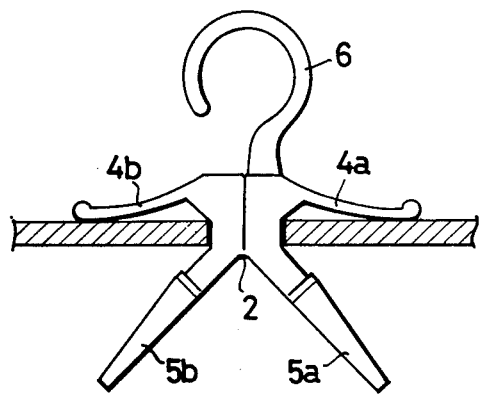

FIG. 4 is a front elevation of another preferred embodiment of the fixing device according to the present invention.

Figure 5:
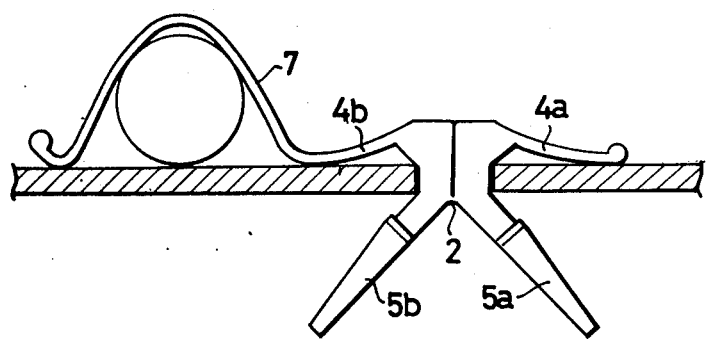

FIG. 5 is a front elevation of still another preferred embodiment of the fixing device of this invention.

DESCRIPTION OF THE PREFERRED EMBODIMENT

Figure 2:
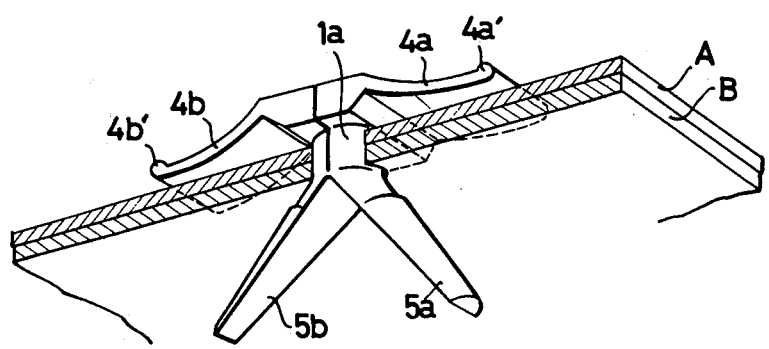
FIG. 2 is a perspective view of the fixing device of FIG. 1 as used in joining a plurality of panels in face-to-face contact.

FIGS. 1–3 of the accompanying drawings illustrate one preferred embodiment of the fixing device of this invention as used in joining two panels A, B in the face-to-face contact. A cylindrical shank is divided by a centrally inserted vertical slit into two opposed shank sections 1a, 1b connected at their respective lower ends through a hinge portion 2 so that said shank sections are freely converged and diverged at said hinge portion. The shank sections are provided at their upper ends with head portions 3a, 3b each formed of a thick-wall plate. From the opposite lateral faces of the head portions, resilient wing members 4a, 4b extend away and aslant downwardly. Engaging leg members 5a, 5b extend away and aslant downwardly from the lower ends of said shank sections, correspondingly to said resilient wing members.

Normally, the shank sections 1a, 1b are held in their converged state having the opposed slit faces brought as close to each other as possible as illustrated in FIG. 1, so that they assume the shape of a single cylinder. The pair of resilient wing members 4a, 4b which extend away from the head portions 3a, 3b of the shank sections are formed so that their respective leading ends 4a', 4b' fall in a level equal to or lower than the level of the hinge portion 2 when the shank sections are held in said converged state. The pair of engaging leg members 5a, 5b extending away from the lower ends of the shank sections can be diverged about the hinge portion 2 and are disposed at a certain angle with reference to the axis of the vertical slit formed between the opposed faces of the shank sections when they are in their fully converged state.

In the preferred embodiment under discussion, said engaging leg members 5a, 5b can be diverged up to practically a right angle, so that each engaging leg member forms an angle of 45° with reference to said axis of the vertical slit. This angle resulting from the divergence of the engaging leg members may be determined to suit the thickness of the panel, the diameter of the hole bored in the panel or some other similar factor.

The fixing device of the present invention which is constructed as described above is formed integrally with a thermoplastic material in such a way that the component parts thereof are disposed symmetrically with reference to the vertical line passing the hinge portion 2 connecting the shank sections 1a, 1b. This fixing device is used in the sequence of the steps (A) through (C) of FIG. 3 for the purpose of joining a plurality of panels in the face-to-face contact.

Now, the manner in which the fixing device of this invention is used will be described in detail with reference to the drawing. In two panels A, B given to be joined, two holes a, b having an equal diameter greater than the diameter of the shank sections in their fully converged cylindrical state are bored. Then, the two panels are placed one directly on top of the other, with the bored holes exactly registered. Then, from above the registered bored holes, the two engaging leg members 5a, 5b which are normally held in their diverged state are closed and lowered so that their leading ends pass into the bored hole as illustrated in FIG. 3(A). As the two engaging leg members are converged as just mentioned, the shank sections 1a, 1b simultaneously diverge about the hinge portion as the fulcrum. In consequence of the divergence of the shank sections, the resilient wing members 4a, 4b are further inclined downwardly to an acuter angle and the leading ends 4a', 4b' of said wing members are brought into contact with the upper surface of the panel A. Against the resistance offered to the resilient wing members by the panel, the engaging leg members 5a, 5b are forced down deeply into the cavity of the bored holes a, b while causing the resilient wing members to flex. Consequently, the two engaging leg members gradually pass through the bored holes and eventually protrude from the lower surface of the bottom panel and, at the same time, induce the two shank sections to move into the cavity as illustrated in FIG. 3(B). During the passage of the engaging leg members through the bored holes, the shank sections while in motion toward the bored holes remain in a state diverged about the hinge portion 2 as the fulcrum so long as the engaging leg members are held in their converged state. When the engaging leg members complete their passage through the bored holes and consequently are relieved of the pressure of convergence, they are diverged under the repulsive force exerted by the resilient wing members 4a, 4b now held in a flexed state as illustrated in FIG. 3(C). At that very moment, the shank sections are completely drawn into the bored holes, accelerating the passage of the hinge portion 2 into the bored holes and causing the shank sections to converge about the hinge portion as the fulcrum. Even after the shank sections have been completely converged in consequence of the passage into the bored holes, the leading ends of the resilient wing members still remain in a flexed state on the upper surface of the panel A and retain a repulsive force. This repulsive force then tends to lift the entire fixing means, with the result that the engaging leg members which have completely passed through the entire depth of the bored holes are drawn in the direction of release and the outer surfaces of the two diverged leg members are brought into engaging contact with the lower edge of the bored holes. Thus, preparatory to the passage through the bored holes, the engaging leg members of the fixing device of this invention are brought into a converged state. After they have been forced in that state through the bored holes, they immediately resume their original diverged state. It happens that the two resilient wing members are adapted so as to have their respective leading ends fall in a level equal to or lower than the level of the hinge portion. Consequently, the resilient wing members now resting on the upper surface of the top panel remain in a flexed state and, therefore, exert a repulsive force upon the upper panel A, while the engaging leg members are held fast in engaging contact with the bottom panel B. As a result, the two panels are pressed down against each other between the wing members and the leg members. Once the fixing device of this invention is fastened to the bored holes of the two panels as described above, the opposed resilient wing members exert pressure to bear upon the shank sections in their converging direction and cause the engaging leg members 5a, 5b to diverge. The fixing device, therefore, cannot slip off the bored holes but keeps the two panels joined fast in the face-to-face contact.

Since the fixing device of the present invention is fastened in the bored holes of the panels substantially by virtue of the resilience of the resilient wing members and the divergence of the engaging leg members, it enables the two panels to be joined fast in the face-to-face contact even if the outside diameter of the shank sections 1a, 1b held in their fully diverged state is a little short of equalling the diameter of the bored holes. Possible variation in the thickness of panels being joined has no adverse effect upon the operation of the fixing device of this invention, because such a variation of the panel thickness can be absorbed by the resilience of the resilient wing members. Thus, the fixing device of this invention has an advantage that its usefulness is not dependent on the thickness of panels and the diameter of bored holes.

FIGS. 4 and 5 are other preferred embodiments representing further improved versions of the preferred embodiment of this invention so far described. FIG. 4 illustrates a case wherein the fixing device described above is modified by having a hook integrally extended from the upper end of one of the head portions 3a so as to serve the purpose of hanging an article on the panel. The preferred embodiment illustrated in FIG. 5 is also a modified version of the fixing device of the present invention in respect that the leading end of one of the resilient wing member 4b is elongated in the shape of an arcuate arm member 7, so that a bundle of electric wires or a pipe may be retained in position on the panel surface at the same time that the fixing device is fastened to the panel.

In each of the preferred embodiments described above, stepped portions 8 are provided one each intermediate the entire length of the engaging leg members 5a, 5b. These stepped portions serve the purpose of preventing the engaging leg members already brought into engaging contact with the bored holes from being drawn out of the bored holes. They are not always an absolute necessity because the actual fastening of the fixing member is accomplished by the divergence of the leg members. Only when the combined thickness of panels being joined is greater than the length of the shank and the diameter of the bored holes in the panels is considerably greater than the diameter of the shank, the stepped portions are brought into hooking contact with the lower edge of said bored holes and, therefore, function effectively in securing the fixing device fast in position relative to the bored holes.

Besides being useful as effective means for joining a plurality (not necessarily limited to "two") of panels in the face-to-face contact, the fixing device can be used as means for hanging an object as described above. Thus the fixing device of this invention has an outstanding advantage that it finds acceptance in a wide variety of applications and greatly abounds in practical utility.

I claim:

1. A one-piece plastic fastener adapted to be accepted in an apertured workpiece including a shank which is axially split into two substantially D-shaped opposed shank sections which when in abutting relationship form a solid cylinder, said shank sections connected to each other at respective first ends by a hinge means so that said shank sections can be freely moved toward abutting relationship and away from each other about said hinge means, head means extending laterally at the opposite ends of each of said shank sections, said head means having surfaces abutting when said shank sections abut and having undersurfaces with a greater lateral extent than said aperture for engaging said workpiece, said head means each being relieved along an edge opposite said abutting surface and further including a pair of resilient wing members integral with said head means along said edge in spaced relation to said shank, said wings extending outwardly away from said head means and angularly downwardly toward said first ends of said shank sections, said wing members terminating in free ends lying substantially on a common plane perpendicular to said axial split, said plane being spaced from said head means a distance at least equal to the distance from said head means to said hinge means, and a pair of substantially D-shaped integral leg members initially extending outwardly and angularly away from the first ends of said shank sections generally parallel to said wing member attached to their respective shank sections, each of said leg members includes shoulder means spaced from and facing said shank.

2. A fastener of the type claimed in claim 1, wherein retaining means are integrally disposed on the head portion of one of said shank sections.

3. A fastener of the type claimed in claim 1, wherein one of said resilient wing members is extended so as to serve as retaining means.

4. a fastener of the type claimed in claim 1 wherein said head means are substantially rigid rectangular members which along one edge extend upwardly and outwardly from the surfaces adapted to engage the workpiece to form said relief.

* * * * *